(12) United States Patent
Matsushita et al.

(10) Patent No.: US 9,048,525 B2
(45) Date of Patent: Jun. 2, 2015

(54) ANTENNA CIRCUIT

(75) Inventors: Taiga Matsushita, Itabashi-ku (JP);
Katsumi Katakura, Itabashi-ku (JP);
Takakazu Murakami, Itabashi-ku (JP);
Masateru Yamakage, Itabashi-ku (JP)

(73) Assignee: LINTEC CORPORATION, Tokyo (JP)

( * ) Notice: Subject to any disclaimer, the term of this patent is extended or adjusted under 35 U.S.C. 154(b) by 775 days.

(21) Appl. No.: 12/918,257

(22) PCT Filed: Feb. 17, 2009

(86) PCT No.: PCT/JP2009/053118
§ 371 (c)(1),
(2), (4) Date: Aug. 18, 2010

(87) PCT Pub. No.: WO2009/104778
PCT Pub. Date: Aug. 27, 2009

(65) Prior Publication Data
US 2010/0328162 A1 Dec. 30, 2010

(30) Foreign Application Priority Data

Feb. 20, 2008 (JP) .................................. 2008-038579

(51) Int. Cl.
*H01Q 7/00* (2006.01)
*G06K 19/07* (2006.01)
*G08B 13/14* (2006.01)
(Continued)

(52) U.S. Cl.
CPC ............ *H01Q 7/00* (2013.01); *G06K 19/07381* (2013.01); *G06K 19/07749* (2013.01); *G06K 19/0776* (2013.01); *H01Q 1/2208* (2013.01); *H01Q 1/38* (2013.01); *H01Q 1/50* (2013.01); *H01Q 9/27* (2013.01)

(58) Field of Classification Search
CPC .................. G06K 19/07381; G06K 19/07749; G06K 19/0776; H01Q 1/2208; H01Q 1/38; H01Q 1/50; H01Q 7/00; H01Q 9/27
USPC ............... 343/866, 867, 895, 906; 340/572.1, 340/572.7; 235/492
See application file for complete search history.

(56) References Cited

U.S. PATENT DOCUMENTS 7,561,047 B2 * 7/2009 Ogata et al. ................. 340/572.1
7,626,548 B2 * 12/2009 Matsushita et al. ..... 343/700 MS
(Continued)

FOREIGN PATENT DOCUMENTS

JP        10-049756 A     2/1998
JP    2000-090224 A     3/2000
(Continued)

*Primary Examiner* — Michael C Wimer
(74) *Attorney, Agent, or Firm* — Sughrue Mion, PLLC

(57) ABSTRACT

An antenna circuit which includes a substrate and a planar circuit with a circuit line of a conductive material formed on a surface of the substrate, and at least one conductive pad (notch-forming part) electrically connected with the circuit line of the planar circuit. Cutting lines, such as perforations, are provided in the substrate around an outer periphery of the notch-forming part and extend into the notch-forming part on either side of connection points where the circuit line connects with the notch-forming part, The cutting lines approach each other in the notch-forming part to form a section (notch port). The antenna circuit can be destroyed even if an IC tag provided with the antenna circuit is peeled off from various directions, and the destruction rate of the circuit can be increased stably.

13 Claims, 10 Drawing Sheets

(51) Int. Cl.
*G06K 19/073* (2006.01)
*G06K 19/077* (2006.01)
*H01Q 1/22* (2006.01)
*H01Q 1/38* (2006.01)
*H01Q 1/50* (2006.01)
*H01Q 9/27* (2006.01)

(56) References Cited

U.S. PATENT DOCUMENTS 8,322,624 B2 * 12/2012 Finn .............................. 235/492

| | | | |
|---|---|---|---|
| 2006/0176511 A1 | 8/2006 | Tagawa | |
| 2008/0036677 A1 | 2/2008 | Matsushita et al. | |

FOREIGN PATENT DOCUMENTS

| | | |
|---|---|---|
| JP | 2006155571 A | 6/2006 |
| JP | 2006-218773 A | 8/2006 |
| JP | 2007-257620 A | 10/2007 |
| JP | 4046167 B2 | 11/2007 |
| JP | 2007-323100 A | 12/2007 |
| JP | 2008-015834 A | 1/2008 |
| WO | 2006/003851 A1 | 1/2006 |
| WO | 2007/017978 A1 | 2/2007 |

* cited by examiner (a)

(b)

(c)

ANTENNA CIRCUIT

FIELD OF THE INVENTION

The present invention relates to an antenna circuit used for an IC tag which can be used for personal certification, goods management, physical distribution management and the like.

DESCRIPTION OF THE PRIOR ART

By attaching a non-contact IC tag to persons for management, and articles such as goods, storage articles and loadings for management, article managements have been conducted to manage these articles recently. For example, the article management has been conducted by attaching a non-contact IC tag recorded with information such as production condition, stock state, cost information and used condition to the goods and optionally further communicating the information by an interrogator and the like.

Management information recorded in an IC chip after the use is important in disposable non-contact IC tag. If the disposable non-contact IC tag is abandoned carelessly, or the IC tag attached on the article once is skillfully peeled off from the article, there are possibilities that the information in the IC chip is read to take, or otherwise put to improper use.

In order to preventing the acts, an IC tag in which two notch-short dashed line forming terminals having a wide circular arc shape (which is nearly a sector shape) connected with a circuit and a lead part are formed in the face, a notch-short dashed line having a shape which is nearly a circular shape are formed so as to pass through the both ends of the notch-short dashed line forming terminals having the circular arc shape, and an adhesive strength on the area including the closed notch-short dashed line of a side which is attached to the goods of the substrate is higher, and an adhesive strength on the opposite side of the substrate is lower or 0, is developed (see JP 2007-0257620 A1). Such an IC tag is illustrated in FIG. 8. This IC tag is superior in a point that a specific tool is not needed in breaking, and a point that the effect of broken situation can be confirmed visually.

However, there is a problem that this IC tag can not obtain the stable effect, because the destruction rate of the circuit is different according to the direction of peeling the IC tag attached to the goods.

DISCLOSURE OF THE INVENTION

An object of the present invention is to provide an antenna circuit used for an IC tag which can be destroyed even if an IC tag is peeled off from various directions, and the destruction rate of the circuit can be increased stably.

As a result of efforts by the present inventors to solve the above-described problems, it was found that the solution of the above described problems are achieved by forming at least one notch-forming part connected with the circuit line of the planar circuit, providing cutting lines in the substrate around an outer periphery of the notch-forming part, extending each of the cutting lines on each side of the circuit line connected with the notch-forming part in the direction of the inside of the notch-forming part from the outside of the notch-forming part, up to the substrate and the notch-forming part, and approaching the cutting lines each other in the notch-forming part to form a notch part. And thus the present invention is completed.

That is to say, the present invention provides an antenna circuit which comprises a substrate, a planar circuit consisting of a circuit line of a conductive material formed on a surface of the substrate, and at least one notch-forming part connected with the circuit line of the planar circuit, wherein cutting lines are provided in the substrate around an outer periphery of the notch-forming part, each of the cutting lines on each side of the circuit line connected with the notch-forming part are extended in the direction of the inside of the notch-forming part from the outside of the notch-forming part, up to the substrate and the notch-forming part, and the cutting lines are approached each other in the notch-forming part to form a notch part.

The present invention also provides the antenna circuit as described above, wherein an angle included (or formed) by each straight line which passes through a closest approaching point of the cutting lines in the notch-forming part and an edge point of the outer periphery of the notch-forming part on the cutting line, is less than 180 degree.

The present invention also provides the antenna circuit as described above, wherein the cutting line is a perforated cutting line which has an alternate arrangement of a joint and a slit.

The present invention also provides the antenna circuit as described above, wherein an IC chip is connected to the planar circuit.

The present invention also provides the antenna circuit as described above, wherein a pressure-sensitive adhesive layer is laminated on at least one surface of the substrate on which the planar circuit is formed.

The present invention also provides the antenna circuit as described above, wherein the pressure-sensitive adhesive layers are formed on both surfaces of the substrate on which the planar circuit is formed, and a protecting sheet is laminated on a surface of any one of the pressure-sensitive adhesive layer, wherein an adhesive strength of the pressure-sensitive adhesive layer contacted to the protecting sheet in an area surrounded with the cutting line is smaller than the adhesive strength of the pressure-sensitive adhesive layer contacted to an adherend.

The present invention also provides the antenna circuit as described above, wherein the pressure-sensitive adhesive layers are formed on both surfaces of the substrate on which the planar circuit is formed, and a protecting sheet is laminated on a surface of any one of the pressure-sensitive adhesive layer, wherein an adhesive strength of the pressure-sensitive adhesive layer contacted to the protecting sheet is smaller than the adhesive strength of the pressure-sensitive adhesive layer contacted to an adherend.

In drawings, 1 means a substrate, 2 means a circuit line, 3 means a planer circuit, 4 means a notch-forming part, 5 means a cutting line, 6 means a notch part, 7 means a lead line, 8 means an IC chip, 10 means an inside lead electrode, 11 means an outside lead electrode, 12 means an insulating layer, 13 means a jumper line, 14 means a pressure-sensitive adhesive layer, 15 means a pressure-sensitive adhesive layer, 16 means a protecting sheet, 20 means an article, A means a closest approaching point of each of the cutting lines, A' means a closest approaching point of each of the cutting lines, B means an edge point of the outer periphery of the notch-forming part on the cutting line, B' means an edge point of the outer periphery of the notch-forming part on the cutting line, C means an angle included by each straight line which passes through A point and B point and a straight line which passes through A' point and B' point.

DETAILED DESCRIPTION OF THE PREFERRED EMBODIMENTS

Figure 1:
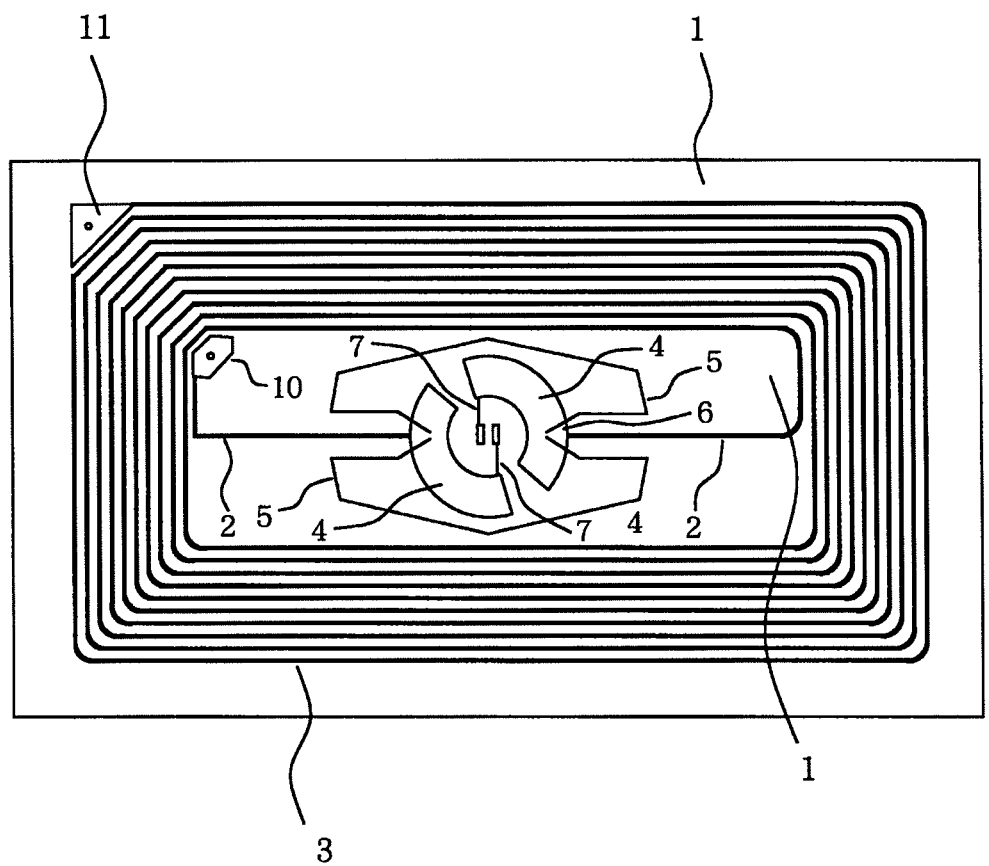
FIG. 1 shows a plane view of an antenna circuit of one embodiment of the present invention.

The IC tag comprising the antenna circuit of the present invention is explained based on the drawings. FIG. 1 shows a plane view of an antenna circuit of one embodiment of the present invention.

The antenna circuit of the present invention comprises a substrate 1, a planar circuit 3 formed on a surface of the substrate 1.

The substrate 1 is preferably papers such as a wood free paper and a coated paper, a nonwoven fabric and a sheet composed of a synthetic resin, and more preferably a sheet composed of a thermoplastic resin.

As the sheet composed of the thermoplastic resin, for example, the sheets composed of one or more of various synthetic resins, such as polyolefin resins like polyethylene resins of high density polyethylene, middle density polyethylene, low density polyethylene and the like, polypropylene resins, polymethyl-1-pentene/ethylene/cyclic olefin copolymer, and ethylene-vinyl acetate copolymer; polyester resins like polyethylene terephthalate, polyethylene naphthalate and polybutylene terephthalate; polyvinyl chloride resins; polyvinylalcohol resins; polyvinylacetal resins; polystyrene resins; polycarbonate resins; polyamide resins; polyimide resins; fluororesins; acrylonitril/butadiene/styrene copolymer; copolymers containing two or more polymerization units thereof; polymer blends containing two or more resins thereof; polymer alloys containing one or more resins thereof can be used. In particular, the sheets composed of polyester resins are preferably used. The substrate 1 may be drawn uniaxially or biaxially. The substrate 1 may be composed of single layer or two or more layers of different layers or same layers. Also, the substrate 1 has preferably water resistance. If the substrate has water resistance, a damage such as breaking of the substrate 1 is not caused when the substrate is wet with water. Also, the substrate 1 is preferably a substrate 1 having a hiding property. When the substrate 1 does not have a hiding property, the surface of the substrate 1 is preferably laminated with a sheet having a hiding property.

Thickness of the substrate 1 does not have any limitation. However, the thickness of the substrate 1 is generally in the range of 10 to 250 µm, more preferably in the range of 10 to 200 µm and most preferably in the range of 25 to 125 µm.

In the antenna circuit of the present invention, the planar circuit 3 is composed of circuit line 2 which is formed with a conductive material. The conductive material includes, for example, metal simple substance such as metallic foil, vapor deposition film and thin film produced by sputtering. As the metal simple substance, gold, silver, nickel, copper, aluminium and the like can be used. Also, as the other conductive material, conductive pastes and conductive inks produced by dispersing a particle of metal such as gold, silver, nickel and copper in a binder, can be used.

The average particle diameter of the metal particle is preferably in the range of 1 to 15 µm and more preferably in the range of 2 to 10 µm. The binder includes, for example, polyester resins, polyurethane resins, epoxy resins and phenol resins.

The shape of the planar circuit 3 includes, for example, shapes indicated by FIG. 1. In FIG. 1, the planar circuit 3 functioned as an antenna is formed by arranging the circuit line 2 of a line of conductive material in decaplet spiral ring having specific space between each lines in the direction from the outside circumference of a rectangle substrate 1 to the inside. The planar circuit 3 may be arranged in decaplet spiral ring as indicated in FIG. 1, or may be arranged in singlet spiral ring to nonaplet spiral ring, or eleven or more multiplet spiral ring.

The antenna circuit of the present invention has at least one conductive pad, hereinafter termed a notch-forming part 4, electrically connected with the circuit line 2 of the planar circuit 3 at at least one electrical connection point. The notch-forming part 4 can have various shapes, but is preferably a planar shape.

The shape of the notch-forming part 4 is a wide circular arc shape in FIG. 1, but does not have any limitation. Also, the shape of the notch-forming part 4 includes polygons such as triangle, quadrangle, pentagon, hexagon, heptagon and octagon, circle and ellipse.

The size of the notch-forming part 4 is preferably larger than the line width of the connected circuit line 2. The size of longitudinal direction of the notch-forming part 4 is preferably 1 to 20 mm, and the size of width direction of the notch-forming part 4 is preferably 1 to 20 mm.

If the circuit line 2 has a sufficient line width to form the notch part 6 by providing the cutting line 5, it is not necessary that the size of the notch-forming part 4 is larger than the line width of the circuit line 2, and also, it is not necessary that the notch-forming part 4 is formed over the line width of the circuit line 2. In the case, the notch-forming part 4 is a position in which the cutting line 5 is formed in the halfway of the circuit line 2 and the notch part 6 is formed.

The notch-forming part 4 is composed of conductive material. The conductive material includes the same materials as described before.

Figure 3:
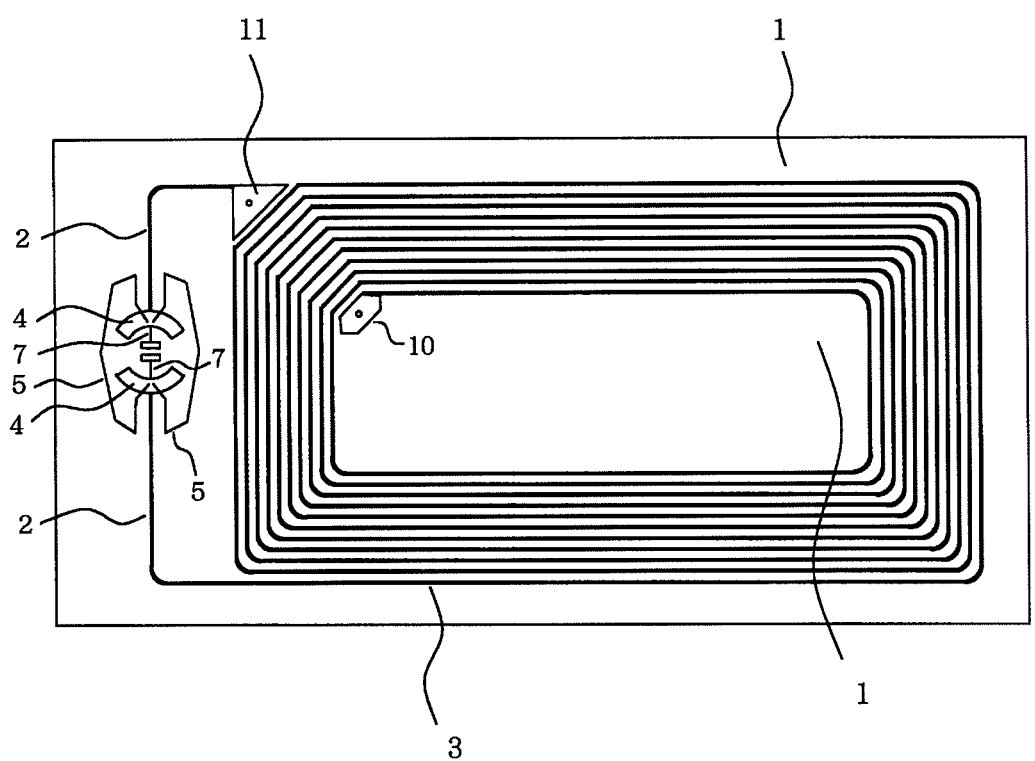
FIG. 3 shows a plane view of an antenna circuit of another embodiment of the present invention.

The notch-forming part 4 can be formed inside of the planar circuit 3 as shown in FIG. 1, or outside of the planar circuit 3 as shown in FIG. 3.

Figure 13:
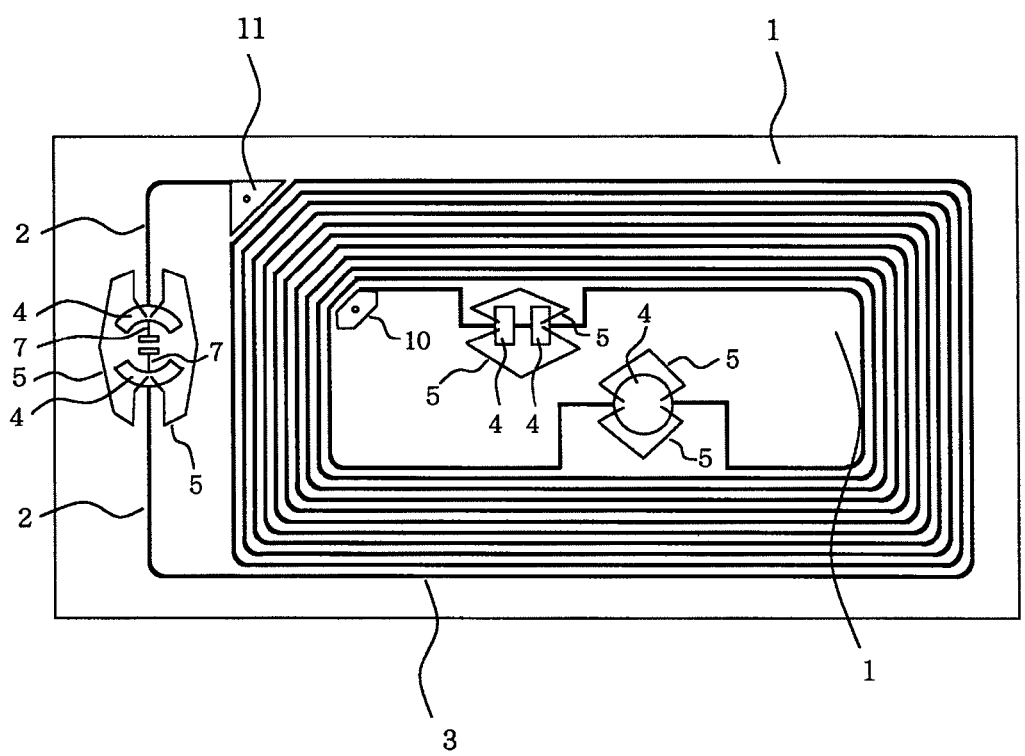
FIG. 13 shows a plane view of an antenna circuit of another embodiment of the present invention.

Also, in FIG. 1, there are two notch-forming parts 4, but the number of the notch-forming part 4 can be one, or not less than 3 as shown in FIG. 13.

The IC chip 8 is connected to both ends of the planar circuit 3. The IC chip 8 can be formed inside of cyclic shape of the planar circuit 3, outside of cyclic shape of the planar circuit 3, or in the halfway of cyclic shape of the planar circuit 3.

Figure 2:
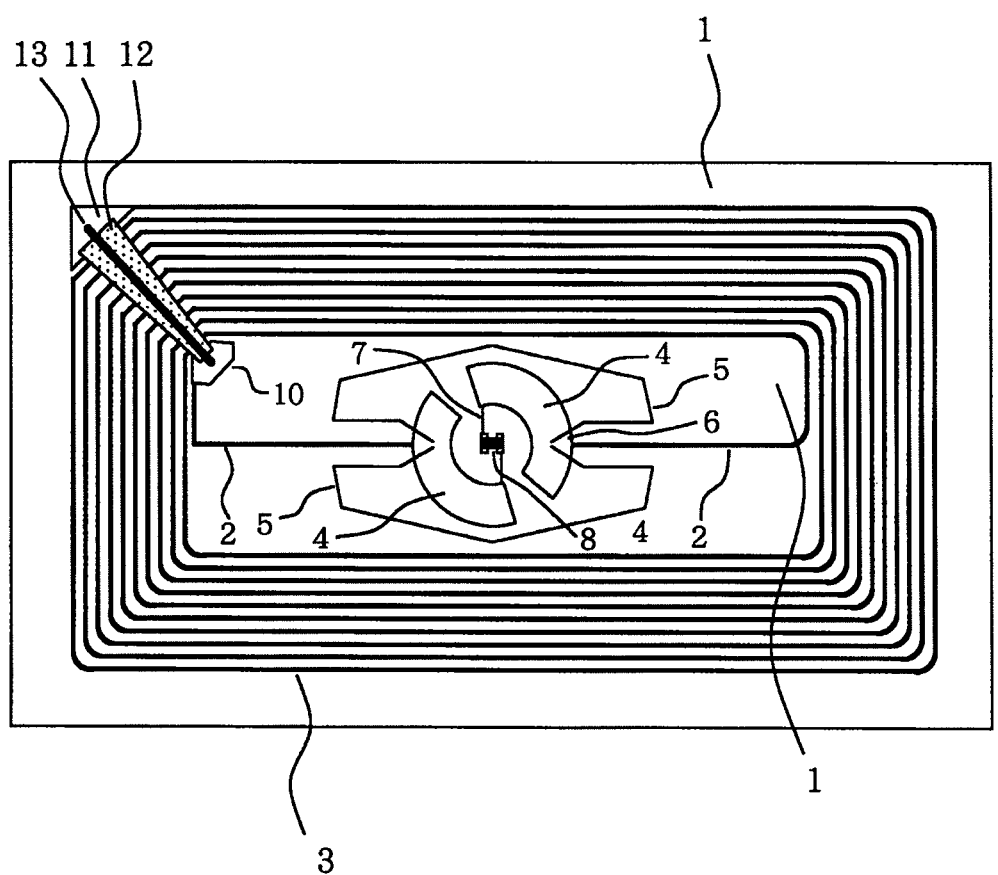
FIG. 2 shows a plane view of an antenna circuit of one embodiment of the present invention with an IC chip and a jumper circuit.

In FIG. 2, the IC chip 8 is arranged to be surrounded with two notch-forming parts 4, and the notch-forming part 4 and the IC chip 8 are connected with the lead line 7 composed of the same conductive material as mentioned before. The lead line 7 is preferably connected with the IC chip easily by providing a wide portion of lead line 7 at the position connected with the IC chip 8.

In order to connect the ends of most outside ring and most inside ring of the planar circuit 3 to the IC chip 8, the end of most outside ring or most inside ring of the planar circuit 3 is preferably connected to the IC chip 8 by forming the line (jumper circuit) jumped over on the ring planar circuit 3 in direction of the inside or the outside of the planar circuit 3, without short circuit to the spiral ring planar circuit 3. In this case, it is preferable that a wide outside lead electrode 11 composed of the same conductive material as described before is formed on the ends of most outside ring of the planar circuit 3, and a wide inside lead electrode 10 composed of the same conductive material as described before is formed on the ends of most inside ring of the planar circuit 3.

Figure 4:
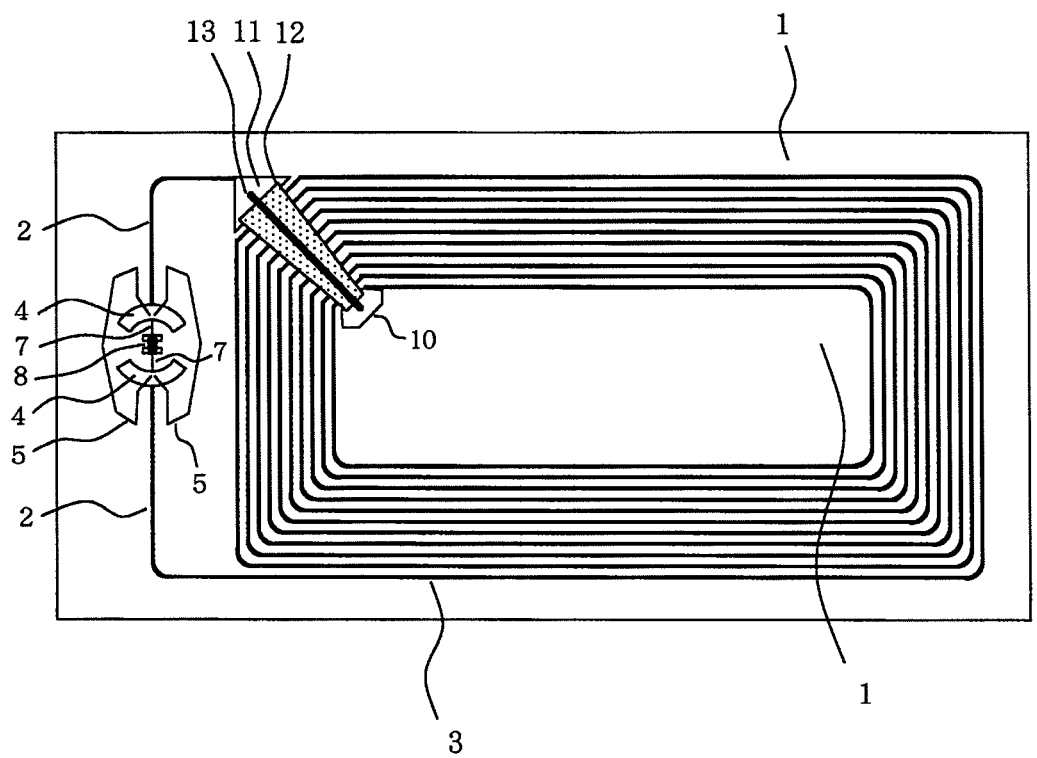
FIG. 4 shows a plane view of an antenna circuit of the other embodiment of the present invention with an IC chip and a jumper circuit.

In the antenna circuit of the present invention, as shown in FIG. 2 and FIG. 4, in order to connect the inside lead electrode 10 and the outside lead electrode 11, the inside lead electrode 10 and the outside lead electrode 11 are preferably connected through the jumper line 13.

The method for forming the jumper line 13 includes a method for connecting the inside lead electrode 10 and the outside lead electrode 11 by printing an insulating ink in band crossing the upper surface portion of the circuit line 2 of the spiral ring planar circuit 3 between the inside lead electrode 10 and the outside lead electrode 11 by screen printing or the like and drying to form an insulating layer 12, and then printing a conductive paste in line on the printed insulating layer 12 by screen printing or the like and drying to form the jumper line 13. The conductive paste includes the conductive pastes illustrated as the conductive material described before. The insulating ink includes photo-curable ink such as ultraviolet curable ink comprising acrylic resin or urethane resin as main component.

The method for connecting the IC chip 8 includes a method for connecting by a flip-chip bonding method that the IC chip is connected on the surface of the end of the planar circuit 3 through the anisotropic conductive film or the anisotropic conductive paste. The flip-chip bonding method is a method for conducting easily between the end of the planar circuit 3 and the IC chip 8 by forming a wire bump on an electrode portion of the IC chip 8, and pressing the surface of the wire bump formed on the IC chip 8 on the anisotropic conductive film or the anisotropic conductive paste covered on the surface of the end of the planar circuit 3 so that the wire bump inserts in the anisotropic conductive film or the anisotropic conductive paste. By connecting the IC chip 8 to the planar circuit 3 in the manner described above, the antenna circuit connected with the IC chip 8, that is, the IC inlet can be produced.

The method for forming the planar circuit 3, the notch-forming part 4, the inside lead electrode 10, the outside lead electrode 11, the lead line 7 and the lead line wide portion on the substrate includes a method for laminating a metal foil to the substrate 1 with an adhesive, printing a resist pattern in the shape of the planar circuit 3, the notch-forming part 4, the inside lead electrode 10, the outside lead electrode 11, the lead line 7 and the lead line wide portion by screen printing and the like, and then removing the metal foil of the portion except for the planar circuit 3, the notch-forming part 4, the inside lead electrode 10, the outside lead electrode 11, the lead line 7 and the lead line wide portion by the etching treatment and washing the resist to form the planar circuit 3, the notch-forming part 4, the inside lead electrode 10, the outside lead electrode 11, the lead line 7 and the lead line wide portion. The etching treatment can be conducted by the same treatment as ordinary etching treatments. Also, the forming of the planar circuit 3 on the surface of the substrate 1 can be conducted by adhering the conductive paste in the shape of the planar circuit 3 by the means of printing, applying or the like.

The thickness of the circuit line 2 of the planar circuit 3, the notch-forming part 4, the inside lead electrode 10, the outside lead electrode 11, the lead line 7 or the lead line wide portion does not have any limitation, and may be the same or different. However, the thickness of the metal foil is preferably in the range of 5 to 50 µm, the thickness of the vapor deposition film and the metal film prepared by sputtering is preferably in the range of 0.01 to 30 µm, and the thickness of the conductive paste is preferably in the range of 3 to 30 µm.

The width of the circuit line 2 does not have any limitation. However, the width of the circuit line 2 is preferably in the range of 0.01 to 10 mm and more preferably in the range of 0.1 to 3 mm.

In the antenna circuit of the present invention, the cutting line 5 is provided in the substrate 1 around an outer periphery of the notch-forming part 4.

The cutting line 5 can be a cutting line 5 having a continuous slit, or a perforated cutting line 5 having an alternate arrangement of a joint and a slit. In the perforated cutting line 5 having an alternate arrangement of the joint (which is non-cutting portion) and the slit (which is cutting portion), the length of the joint is preferably in the range of 0.08 to 1.5 mm, more preferably in the range of 0.2 to 1 mm, and most preferably in the range of 0.4 to 0.8 mm. When the length of the joint is less than 0.08 mm, it is difficult to form the joint accurately so that the destruction of the joint is caused easily. When the length of the joint is more than 1.5 mm, there is a case that it is difficult to cause the destruction of the circuit of the IC tag at peeling of the IC tag. The length of the slit can be selected properly. However, the length of the slit is preferably in the range of 0.5 to 10 times of the length of the joint, more preferably in the range of 0.8 to 6 times of the length of the joint and most preferably in the range of 1 to 4 times of the length of the joint.

The cutting line 5 provided in the substrate 1 around an outer periphery of the notch-forming part 4 is preferably formed in overall length of the thickness direction of the substrate 1, but, can be linked in a part of overall length of the thickness direction of the substrate 1.

The cutting line 5 provided in the substrate 1 around an outer periphery of the notch-forming part 4 can be continuous or discontinuous, but, is preferably continuous. In the discontinuous cutting line, the number of discontinuous points can be one, or two or more.

The cutting line 5 provided in the substrate 1 around an outer periphery of the notch-forming part 4 is needed to provide not to cut the circuit line 2. In other words, the cutting line 5 should not traverse the circuit line 2. Preferably, the cutting line should bracket the point where the circuit line contacts the notch-forming part 4. When the cutting line 5 cuts the circuit line 2, the planar circuit 3 does not operate normally. The cutting line 5 is preferably provided separately from the circuit line 2. The length to separate the cutting line 5 from the circuit line 2 is preferably not less than 0.5 mm, and more preferably not less than 1 mm.

Figure 5:
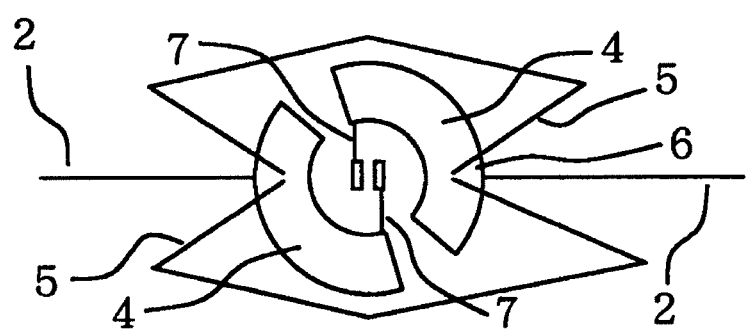
FIG. 5 shows a plane view of a shape of one embodiment of a cutting line in an antenna circuit of the present invention.

The shape of the cutting line 5 provided in the substrate 1 around an outer periphery of the notch-forming part 4 does not have any limitation. For example, the shape can be symmetrical polygons having connected straight lines as shown in FIG. 1, nonsymmetrical polygons having connected straight lines as shown in FIG. 5, or curved lines.

Figure 6:
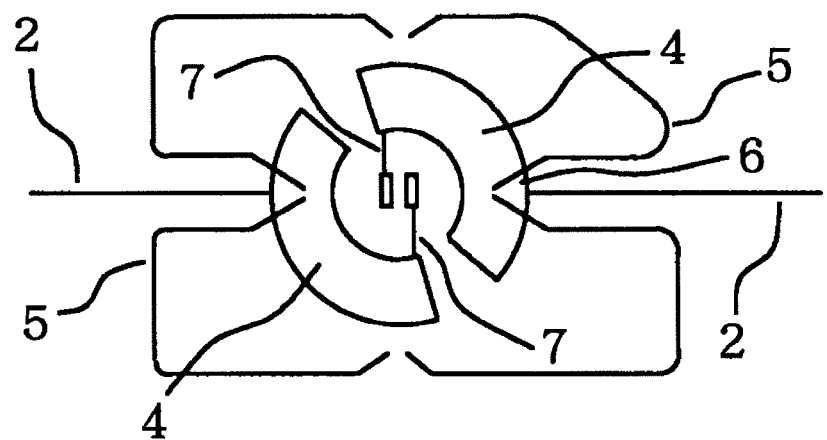
FIG. 6 shows a plane view of a shape of another embodiment of a cutting line in an antenna circuit of the present invention.

Also, the shape of the cutting line 5 provided in the substrate 1 around an outer periphery of the notch-forming part 4 can be rounded shapes or shapes divided in the middle portion, as shown in FIG. 6.

Figure 7:
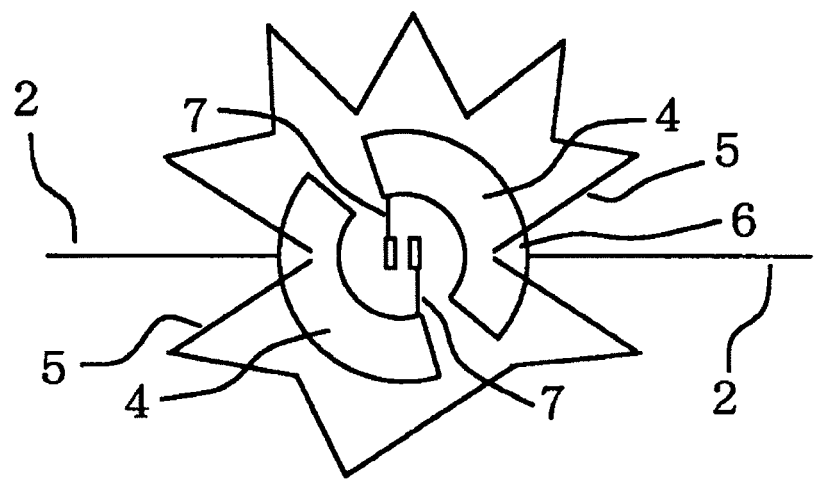
FIG. 7 shows a plane view of a shape of a further embodiment of a cutting line in an antenna circuit of the present invention.

Further, the shape of the cutting line 5 provided in the substrate 1 around an outer periphery of the notch-forming part 4 can be zigzag shapes having sharp crimped point or zigzag shapes having rounded crimped point, as shown in FIG. 7.

Figure 9:
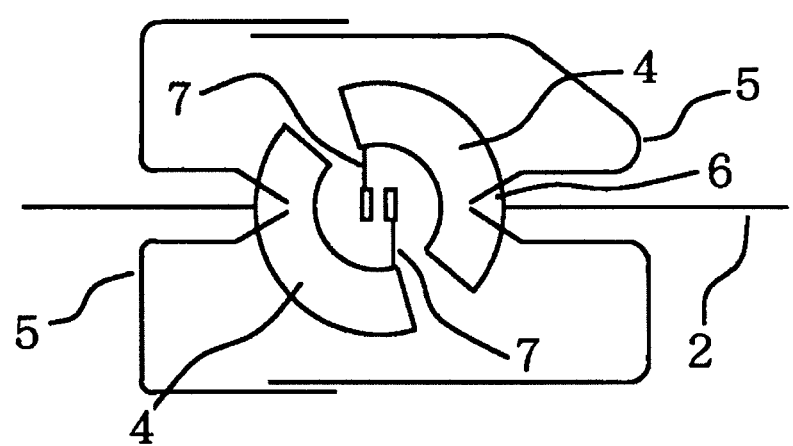
FIG. 9 shows a plane view of a shape of yet another embodiment of a cutting line in an antenna circuit of the present invention.
Figure 10:
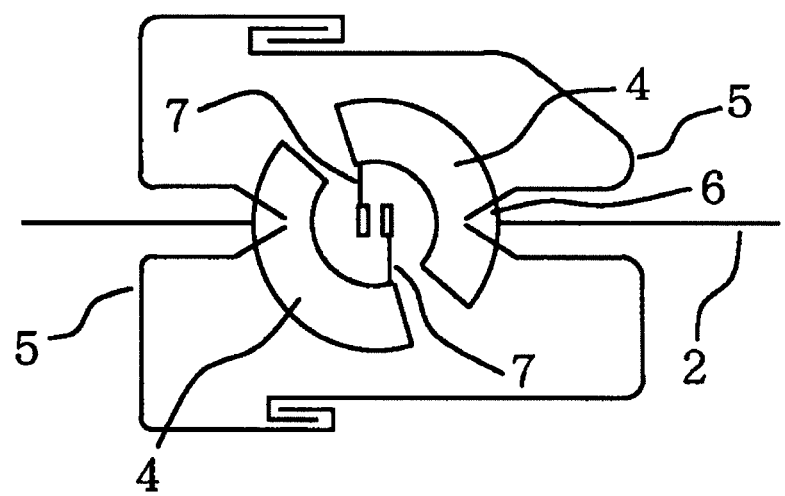
FIG. 10 shows a plane view of a shape of and additional embodiment of a cutting line in an antenna circuit of the present invention.

Furthermore, the shape of the cutting line 5 provided in the substrate 1 around an outer periphery of the notch-forming part 4 can be shapes of discontinuous cutting lines 5 arraigned in parallel as shown in FIG. 9 or hook shapes of discontinuous cutting lines 5 as shown in FIG. 10.

Also, the cutting line 5 provided in the substrate 1 around an outer periphery of the notch-forming part 4 can be formed to be drawn inside of the notch-forming part 4 in the middle portion.

In the antenna circuit of the present invention, each of the cutting lines 5 in each side of the circuit line 2 connected with the notch-forming part 4 are extended in the direction of the inside of the notch-forming part 4 from the outside of the notch-forming part 4, up to the substrate 1 and the notch-forming part 4, and the cutting lines 5 approach each other in the notch-forming part 4 to form a conductive section, hereinafter termed a notch part 6.

Figure 14:
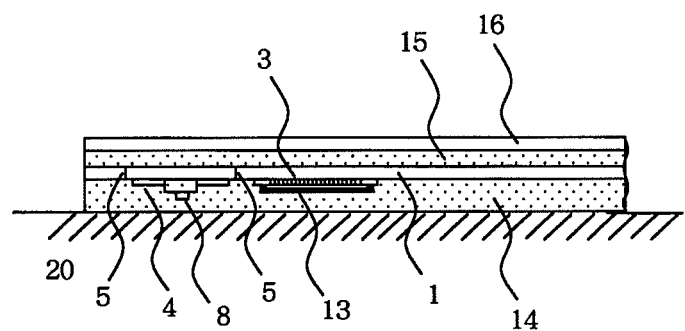
FIGS. 14(a)-14(c) show, in cross-section. states of an IC tag comprising an antenna circuit of the present invention being peeled off after the IC tag is attached to an article.
Figure 14:
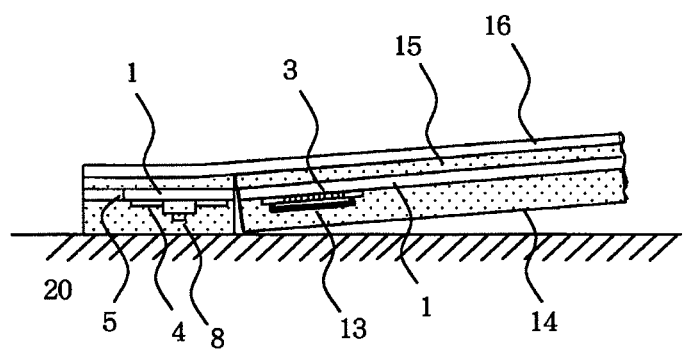
Figure 14:
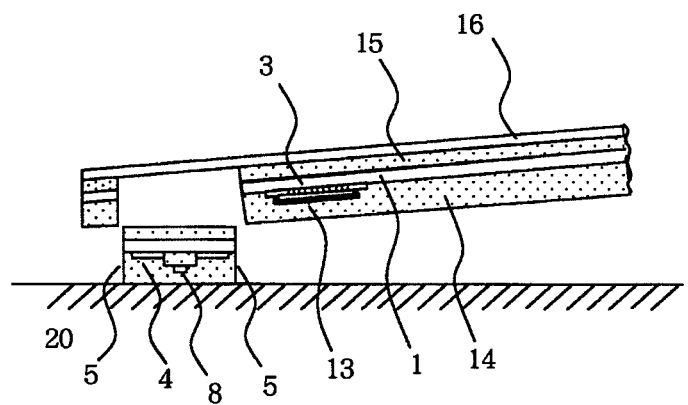

As the result of such structure, as shown in FIG. 14, the IC tag is attached on the article as shown in (a), next, when IC tag is tried to peel from the article as shown in (b), the substrate 1 peeled off from the end portion of IC tag is cut and separated from the inside substrate 1 surrounded with the cutting line 5 at the place of the cutting line 5 provided in the substrate 1 around an outer periphery of the notch-forming part 4, further, when the peeling of IC tag from the article is proceeded as shown in (c), the notch part 6 is torn at a closest approaching point of each of the cutting lines 5 inside the notch-forming part 4 to break the circuit, and finally, the area surrounded with the cutting line provided around the outer periphery of the notch-forming part alone remains in the state of attaching to the article and the other portion except for the area is peeled off.

As mentioned before, the cutting line 5 inside the notch-forming part can be a cutting line 5 having a continuous slit, or a perforated cutting line 5 having an alternate arrangement of a joint and a slit. Also, the cutting line 5 can be a straight line or a curved line.

Figure 11:
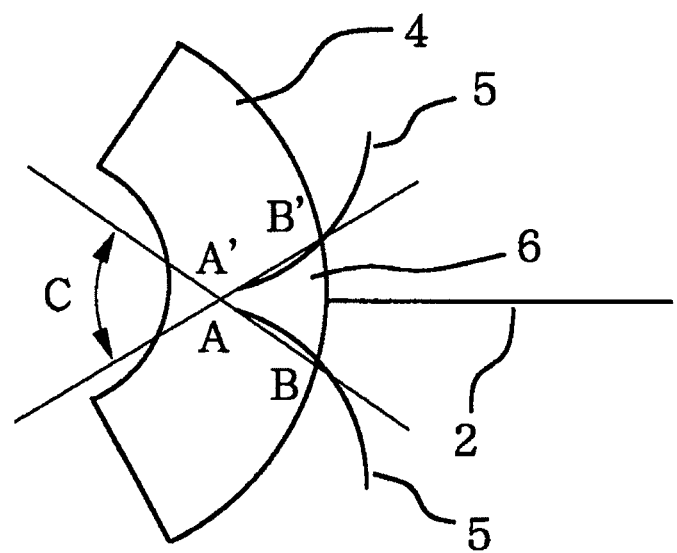
FIG. 11 shows a plane view of one embodiment of a notch part 6 in an antenna circuit of the present invention.

FIG. 11 shows an enlarged figure of an example of the periphery of the notch-forming part 4. Each of the cutting lines 5 on each side of the circuit line 2 connected with the notch-forming part 4 are extended in the direction of the inside of the notch-forming part 4 from the outside of the notch-forming part 4, up to the substrate 1 and the notch-forming part 4.

The cutting line 5 provided inside the notch-forming part 4 is preferably formed in overall length of the thickness direction of the notch-forming part 4 and the substrate 1, but, can be linked in a part of overall length of the thickness direction of the notch-forming part 4 and the substrate 1.

Also, inside the notch-forming part 4, each of the cutting lines 5 are approached, but not connected. If the closest space of each of the cutting lines 5 is a distance enough to tear the notch part 6 at the closest point by peeling the IC tag, the closest space can be any distance. The closest space of each of the cutting lines 5 is preferably 0.05 to 3 mm, and more preferably 0.1 to 2 mm. When the closest space of each of the cutting lines 5 is less than 0.05 mm, there is a danger of linking of the each of the cutting lines 5 in the case that the process accuracy is low in forming of the cutting lines 5. When the closest space of each of the cutting lines 5 is more than 3 mm, there is a case that it is difficult to break certainly the circuit of the IC tag when the IC tag is peeled off.

Also, as shown in FIG. 11, an angle included by a straight line which passes through a closest approaching point A of one cutting line 5 and an edge point B of the outer periphery of the notch-forming part 4 on the cutting line 5 and a straight line which passes through a closest approaching point A' of another cutting line 5 and an edge point B' of the outer periphery of the notch-forming part 4 on the cutting line 5, together define an apex in the notch-forming part and define an angle of preferably less than 180 degree, more preferably less than 120 degree, and most preferably less than 90 degree. Further, the lower limit value of the angle included by each of the straight lines is preferably not less than 5 degree, more preferably not less than 10 degree, and most preferably not less than 30 degree.

The cutting line 5 can be formed by using a punching blade which is used in punching to cut each antenna circuit individually. It is preferably to use the punching blade which is prepared to have a desired shape pattern of the cutting line 5. If the formation of the cutting line 5 is conducted after the planar circuit 3 is formed on the substrate 1, the formation of the cutting line 5 can be conducted at any stage, and does not have any limitation. For example, the formation of the cutting line 5 can be conducted after the planar circuit 3 is formed on the substrate 1, after the pressure-sensitive adhesive layer is laminated on the substrate 1 on which the planar circuit 3 is formed, or after the protecting sheet is laminated on one of the pressure-sensitive adhesive layers being formed on both surfaces of the substrate 1 on which the planar circuit 3 is formed. Among them, it is preferably to form the cutting line 5 by the punching blade after the pressure-sensitive adhesive layer is laminated on the substrate 1 on which the planar circuit 3 is formed, and then to laminate the protecting sheet. By using such method, the cutting line 5 is not formed in the protecting sheet and therefore, there is an effect that the existence of the cutting line 5 is not visible when the article provided with IC tag and containing the antenna circuit of the present invention is observed from the surface, and it is difficult to confirm the provision of the function for preventing reattachment from the outside.

Figure 12:
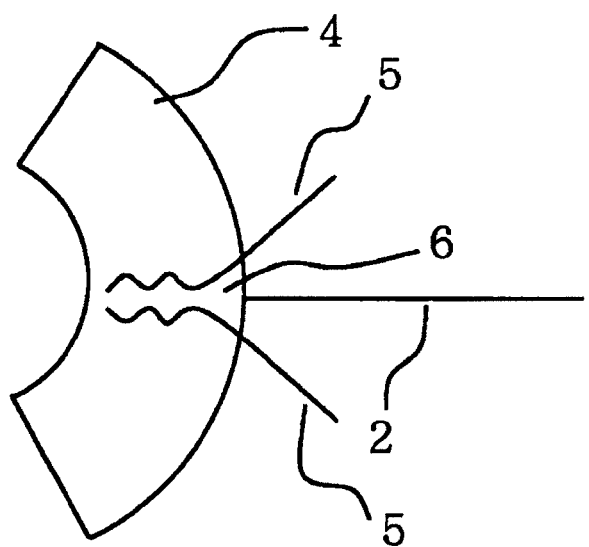
FIG. 12 shows a plane view of another embodiment of a notch part 6 in an antenna circuit of the present invention.

The closest approaching portions of each of cutting lines 5 in the notch-forming part 4 can be two or more. The closest approaching point of each of cutting lines 5 in the notch-forming part 4 which is connected with a straight line at an edge point of the outer periphery of the notch-forming part 4 on the cutting line 5, can be any of the closest approaching points, but does not any limitation. For example, in the case that each of cutting lines 5 in the notch-forming part 4 has a shape of wave repeating approach and separation as shown in FIG. 12, the closest approaching portions of each of cutting lines 5 are three. In such case, the closest approaching portion of each of cutting lines 5 can be any of the closest approaching points.

In the antenna circuit laminated with a pressure-sensitive adhesive layer of the present invention, that is, the IC tag, the pressure-sensitive adhesive layer is laminated on at least one surface of the substrate 1 on which the planar circuit 3 is formed.

The surface of the substrate 1 to be laminated with the pressure-sensitive adhesive layer can be the surface on which the planar circuit 3 is formed, the opposite surface thereof, or both surfaces thereof.

Pressure-sensitive adhesives used in the pressure-sensitive adhesive layer include, for example, natural rubber pressure-sensitive adhesives, synthetic rubber pressure-sensitive adhesives, acrylic resin pressure-sensitive adhesives, polyester resin pressure-sensitive adhesives, polyvinyl ether resin pressure-sensitive adhesives, urethane resin pressure-sensitive adhesives and silicone resin pressure-sensitive adhesives.

Examples of the synthetic rubber pressure-sensitive adhesives include styrene-butadiene rubber, polyisobutylene rubber, isobutylene-isoprene rubber, isoprene rubber, styrene-isoprene block copolymer, styrene-butadiene block copolymer, styrene-ethylene-butylene block copolymer, ethylene-vinyl acetate thermoplastic elastomer and the like. Examples of the acrylic resin pressure-sensitive adhesives include homopolymers of single monomer such as acrylic acid, methyl acrylate, ethyl acrylate, propyl acrylate, butyl acrylate, 2-ethylhexyl acrylate, methyl methacrylate, ethyl methacrylate, butyl methacrylate, and acrylonitrile, or copolymers of 2 or more of monomers thereof. Polyester resin pressure-sensitive adhesives are copolymers of a polyhydric alcohol and a polybasic acid. The polyhydric alcohol includes ethylene glycol, propylene glycol, and butanediol. The polybasic acid includes terephthalic acid, adipic acid, and maleic acid. Examples of the polyvinyl ether resin pressure-sensitive adhesives include polyvinyl ether, and polyvinyl isobutyl ether. Examples of the silicone resin pressure-sensitive adhesives include dimethylpolysiloxane. The pressure-sensitive adhesives can be used singly or in combination of two or more members.

A tackifier, a softener, an antioxidant, a filler, a coloring agent such as a dye and a pigment or the like can be mixed in the pressure-sensitive adhesive layer, according to needs.

The tackifier includes rosin resins, terpene phenol resins, terpene resins, aromatic hydrocarbon modified terpene resins, petroleum resins, coumarone-indene resins, styrene resins, phenol resins and xylene resins. The softener includes process oils, liquid rubbers and plasticizers. The filler includes silica, talc, clay, calcium carbonate and the like.

Thickness of the pressure-sensitive adhesive layer does not have any limitation. However, the thickness is generally in the range of 1 to 200 μm and preferably in the range of 3 to 100 μm.

The pressure-sensitive adhesive layer in the present invention includes also a pressure-sensitive adhesive layer of pressure-sensitive adhesive double coated type in which the pressure-sensitive adhesive is laminated on both sides of middle substrate. The middle substrate can be selected from the members mentioned before as the substrate 1. As the pressure-sensitive adhesive which is laminated on both sides of the middle substrate, the pressure-sensitive adhesives mentioned before can be used.

When the pressure-sensitive adhesive layers is laminated on both surfaces of the surface on which the planar circuit 3 is formed and the opposite surface thereof, the surface of the pressure-sensitive adhesive layer 15 (second pressure-sensitive layer) laminated on one surface of the substrate 1 is preferably covered with the protecting sheet, and the surface of the pressure-sensitive adhesive layer 14 (first pressure-sensitive layer) laminated on the opposite surface to the surface of the substrate 1 laminated with the pressure-sensitive adhesive layer 15 (second pressure-sensitive layer) is preferably covered with the release liner.

The pressure-sensitive adhesive layer for attaching to the article is the first pressure-sensitive adhesive layer 14, and another pressure-sensitive adhesive layer is the second pressure-sensitive adhesive layer 15.

Further, when the first pressure-sensitive adhesive layer 14 is laminated on only the surface on which the planar circuit 3 is formed, the surface of the pressure-sensitive adhesive layer is preferably covered with the release liner.

The protecting sheet is used for protecting the surface of the IC tag which is attached to the article. The protecting sheet includes the same material as that of the substrate 1 mentioned before, and concretely, for example, the sheets composed of the various resins, such as the sheets composed of polyolefin resins like polyethylene resins of high density polyethylene, middle density polyethylene, low density polyethylene and the like, polypropylene resins, polymethyl-1-pentene/ethylene/cyclic olefin copolymer, and ethylene-vinyl acetate copolymer; polyester resins like polyethylene terephthalate, polyethylene naphthalate, and polybutylene terephthalate; various paper materials such as papers laminated with polyethylene, papers laminated with polypropylene, clay-coated papers, resin-coated papers, glassine papers and wood free papers and the like.

In order to laminate the pressure-sensitive adhesive layer 15 (second pressure-sensitive layer) and the protecting sheet on one surface of the substrate 1, the pressure-sensitive adhesive layer 15 and the protecting sheet can be laminated in order on one surface of the substrate 1, but the protecting label in which the pressure-sensitive adhesive layer 15 is formed on the surface of the protecting sheet is preferably laminated by adhering so as to contact the pressure-sensitive adhesive layer 15 on the surface of the substrate 1.

In the IC tag comprising the antenna circuit of the present invention, the IC tag having a flexible flexural rigidity in whole is preferable because the IC tag is easily broken. To be concrete, in any methods of the laminating methods for the second pressure-sensitive adhesive layer and the protecting sheet, it is preferable to use the material to decrease the flexibility of the protecting label laminated with the protecting sheet and the second pressure-sensitive adhesive layer.

The flexibility of the protecting label is preferably not more than 100 mm, more preferably 10 to 80 mm, furthermore preferably 20 to 70 mm, most preferably 25 to 65 mm, and further most preferably 25 to 40 mm in 45° cantilever softness according to JIS L1084. When the 45° cantilever softness is less than 10 mm, it is necessary to use a thin protecting label and therefore, there is a case that a wrinkle is caused or an aptitude processing is inferior in a process wherein the protecting sheet and the second pressure-sensitive adhesive layer are laminated, or the IC tag is produced by laminating with the protecting label. On the other hand, when the 45° cantilever softness is more than 80 mm, it is difficult to break the antenna circuit, the breaking ratio is decreased, or the thickness of the protecting label is increased, and therefore, it is not preferable that they cause to retrograde in miniaturization or thinning.

The release liner is peeled off in attaching the IC tag to the article. The pressure-sensitive adhesive layer emerged by peeling the release liner can be attached to the article.

As the release liner, for example, release liners in which release treatment is conducted to the surface of the support substrate to be contacted and laminated to the pressure-sensitive adhesive layer according to needs, can be used. As the support substrate, films composed of various resins such as polyethylene terephthalate, polybutylene terephthalate, polyethylene, polypropylene and polyarylate, and various paper materials such as papers laminated with polyethylene, papers laminated with polypropylene, clay-coated papers, resin-coated papers and glassine papers are illustrated.

In the case, representative examples of release treatment include a formation of release agent layer 7 composed of release agent such as silicone resin, long-chain alkyl group-containing resin and fluororesin.

The thickness of the release liner 11 does not have any limitation. However, the thickness can be decided properly.

Further, in the IC tag comprising the antenna circuit of the present invention, the first pressure-sensitive adhesive layer 14 for attaching to the article 20 can be laminated to the substrate 1 on only the area surrounded with the continuous or discontinuous cutting line 5, or by changing the kind of the pressure-sensitive adhesive so as to increase the adhesive strength of the first pressure-sensitive adhesive layer 14 to be laminated to the area surrounded with the continuous or discontinuous cutting line 5 than the adhesive strength of the first pressure-sensitive adhesive layer 14 to be laminated to the other area. The adhesive strength of the first pressure-sensitive adhesive layer 14 is preferably larger, for example, preferably two or more times larger, more preferably three or more times larger, most preferably four or more times larger than the adhesive strength of the other second pressure-sensitive adhesive layer 14. In this case, the adhesive strength of the first pressure-sensitive adhesive layer 14 is preferably 0.1 to 100 N/25 mm, and more preferably 0.3 to 50 N/25 mm. Herein, the adhesive strength is the adhesive strength to the stainless steal plate, which is measured according to JIS Z0237 by using a polyethylene terephthalate film as the support substrate having a thickness of 50 μm. The following adhesive strengths are also measured by the same method.

Furthermore, in the IC tag comprising the antenna circuit of the present invention, the adhesive strength of the portion to be attached to the protecting sheet is preferably smaller than the adhesive strength of the portion to be attached to the article 20 (adherend) in the area surrounded with the continuous or discontinuous cutting line 5 in which the pressure-sensitive adhesive layers are formed on both surfaces of the substrate 1 on which the planar circuit 3 is formed, and the protecting sheet is laminated on the surface of one pressure-sensitive adhesive layer. In the area surrounded with the continuous or discontinuous cutting line 5, the pressure-sensitive adhesive layer is not needed to laminate to the portion to be contacted to the protecting sheet.

In the IC tag comprising the antenna circuit of the present invention, for forming the pressure-sensitive adhesive layer to the surface of the substrate 1 on which the planar circuit 3 is not formed, the pressure-sensitive adhesive layer can be formed by applying the pressure-sensitive adhesive on the surface, or by forming pressure-sensitive adhesive layer on the surface of the release agent layer of the release liner by applying the pressure-sensitive adhesive and then laminating on the surface.

In the IC tag comprising the antenna circuit of the present invention, for forming the pressure-sensitive adhesive layer to the surface of the substrate 1 on which the planar circuit 3 is formed, the pressure-sensitive adhesive layer can be formed by applying the pressure-sensitive adhesive on the surface so as to cover the substrate 1, the planar circuit 3, the notch-forming part 4 and the IC chip 8, or by forming pressure-sensitive adhesive layer on the surface of the release agent layer of the release liner by applying the pressure-sensitive adhesive and then laminating on the surface so as to cover the substrate 1, the planar circuit 3, the notch-forming part 4 and the IC chip 8.

Methods for applying the pressure-sensitive adhesive do not have any limitation, and various methods can be used by various coaters. The coaters include, for example, air knife coater, blade coater, bar coater, gravure coater, roll coater, curtain coater, die coater, knife coater, screen coater, Mayer bar coater and kiss coater.

When the IC tag comprising the antenna circuit of the present invention is peeled off from the article 20 after the IC tag is attached to the article, in particular, the IC tag is peeled off from the article by inserting a finger or the like into the interface between the article and the pressure-sensitive adhesive layer 14 of the IC tag attached to the article 20, the area surrounded with the cutting line 5 alone is remained in the state that the area is attached on the surface of the article 20, the substrate 1 at the position except for the area surrounded with the cutting line 5 is peeled off together with the notch part 6 along to the cutting line 5 and therefore, the circuit is cut by the notch part 6, as indicated in FIG. 14. As the result, the circuit is broken.

Figure 15:
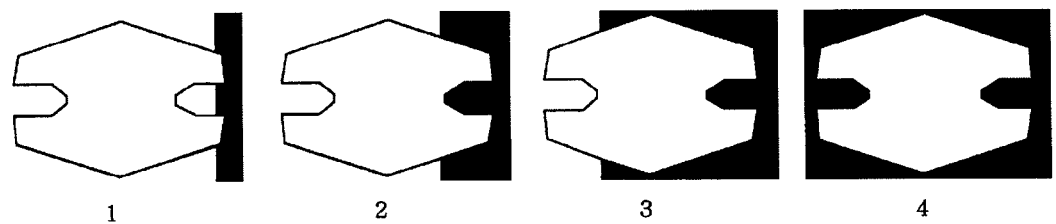
FIG. 15 shows a plane view of a state that an area surrounded with a cutting line in an antenna circuit of the present invention is peeled off.
Figure 16:
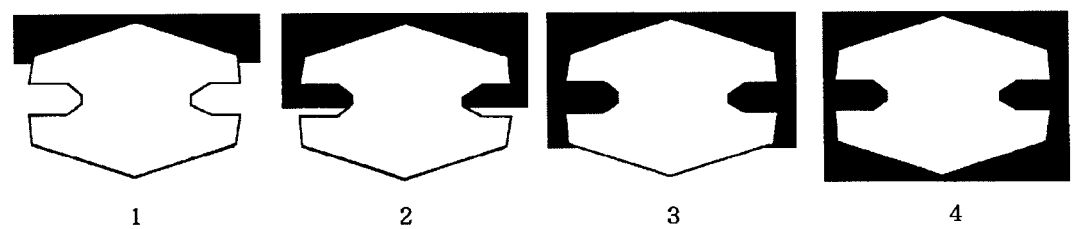
FIG. 16 shows a plane view of a state that an area surrounded with a cutting line in an antenna circuit of the present invention is peeled off from a different direction.
Figure 17:
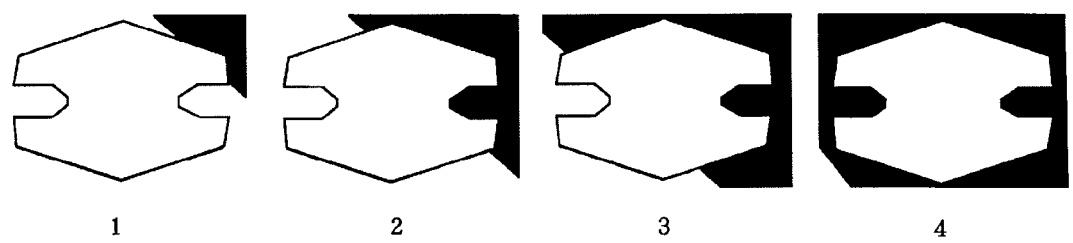
FIG. 17 shows a plane view of a state that an area surrounded with a cutting line in an antenna circuit of the present invention is peeled off from a further direct.

The observation of the situation is shown in FIG. 15 to FIG. 17. In the FIG. 15 to FIG. 17, the figures marked with the number of 1 show the starting of the peeling off around the area surrounded with the cutting line 5, the ratio of the peeling off is larger as the numbers of the figure is increased from 2 to 3, the figures marked with the number of 4 show the perfect or almost perfect peeled off state around the area surrounded with the cutting line 5, and the black parts show the peeled off part. When the IC tag is peeled off from the right cross direction, as shown in FIG. 15, the peeling off from the right cross direction proceeds in order, the closest position of the notch part 6 is broken, and the circuit function is broken. When the IC tag is peeled off from the longitudinal direction, as shown in FIG. 16, the peeling off from the longitudinal direction proceeds in order, the closest position of the notch part 6 is broken, and the circuit function is broken. Further, when the IC tag is peeled off from the right diagonal direction, as shown in FIG. 17, the peeling off form the right diagonal direction proceeds in order, the closest position of the notch part 6 is broken, and the circuit function is broken. Thus, the antenna circuit of the present invention is destroyed even if the IC tag is peeled off from any directions.

The IC tag comprising the antenna circuit of the present invention can be destroyed even if an IC tag is peeled off from any directions, and the destruction rate of the circuit can be increased stably. At the result, the IC tag comprising the antenna circuit of the present invention can damage the function of the IC tag, prevent to read the information recorded in an IC chip, and prevent to reattach to the a different article. Accordingly, the IC tag comprising the antenna circuit of the present invention can prevent information leakage, dirty trick of improper use and the like.

EXAMPLES

The present invention will be explained by examples more concretely in the next paragraph. In addition, the present invention was not restricted at all by these examples.

Example 1

On the surface of a copper foil of trade name "Nikaflex" (produced by NIKKAN INDUSTRIES Co., Ltd.) in which the copper foil (having thickness of 35 μm) and a polyethylene terephthalate film (having thickness of 50 μm) are laminated, a resist pattern was printed in the shape of the notch-forming part 4, the circuit line 2 connected to the notch-forming part, the planar circuit 3, the inside lead electrode 10, the outside lead electrode 11, the lead line 7 and the lead line wide portion by screen printing method. And then, the copper foil of the useless portion except for the notch-forming part 4, the circuit line 2 connected to the notch-forming part, the planar circuit 3, the inside lead electrode 10, the outside lead electrode 11, the lead line 7 and the lead line wide portion was removed by etching to form the integral wiring as shown in FIG. 1. The line widths of the circuit line 2 of the planar circuit, the circuit line 2 connected to the notch-forming part and the lead line 7 were 0.2 mm. With respect to the size of the notch-forming part 4, the length of the longitudinal direction of the circuit line 2 connected to the notch-forming part 4 was 4 mm, and the length of the width direction of the circuit line 2 connected to the notch-forming part 4 was 13 mm. And, the width of the lead line wide portion was 0.8 mm.

Subsequently, an insulating resist ink (produced by TOYOBO CO., LTD., trade name "FR-100G-35") was printed between the inside lead electrode 10 and the outside lead electrode 11 to cover the planar circuit 3 by screen printing method and drying to form an insulating layer 12. Further, a silver paste (produced by TOYOBO CO., LTD., trade name "DW250L-1") was printed between the inside lead electrode 10 and the outside lead electrode 11 by screen printing method and drying to form a jumper line 13. The jumper line 13 was connected to the inside lead electrode 10 and the outside lead electrode 11 to form an antenna circuit.

Next, a RFID-IC chip (produced by Royal Philips Electronics CO., trade name of "I-CODE SLI") was mounted on the formed antenna circuit. The mounting was conducted by using a flip chip packaging machine (produced by KYUSHU MATSUSHITA ELECTRIC CO. LTD., trade name "FB30T-M"). As the bonding material, an anisotropic conductive adhesive (produced by KYOCERA Chemical Corporation, trade name "TAP0402E") was used and a thermo compression bonding was conducted under the condition of 220° C., 2.00 N and 7 seconds to form an antenna circuit mounted with the IC chip (IC inlet).

On the other hand, a release liner having the pressure-sensitive adhesive layer was prepared by applying an acrylic pressure sensitive adhesive (produced by LINTEC Corporation, trade name "PA-T1") on the release-treated surface of the release liner (which was obtained by applying silicone release agent on all surface of one side of a glassine paper and produced by LINTEC Corporation, trade name of "SP-8KX", having a thickness of 80 μm) by using a screen coater, in the amount to be a coated film having the dried thickness of 25 μm to form the first pressure-sensitive adhesive layer 14. The prepared release liner having the pressure-sensitive adhesive layer was laminated and adhered on the surface of the substrate of the antenna circuit mounted with the IC chip on which the planar circuit 3 was formed, by the acrylic resin pressure-sensitive adhesive layer of the release liner. The adhesive strength of the pressure-sensitive adhesive layer was 18 N/25 mm according to JIS-Z0237 mentioned before.

To the produced antenna circuit mounted with the IC chip and having the release liner, cutting lines were provided around an outer periphery of the notch-forming part 4 by using a spiral spring blade. And further, two of the cutting lines on each side of the circuit line 2 connected with the notch-forming part 4 were extended in the direction of the inside of the notch-forming part 4 from the outside of the notch-forming part 4, up to the substrate and the notch-forming part 4. Thus, each of the cutting lines were approached each other in the notch-forming part 4 to form a notch part 6. At the result, the IC tag of the antenna circuit in which the pressure-sensitive adhesive layer with the cutting lines as shown in FIG. 1 was laminated, was produced.

In the IC tag, an angle C included by straight line AB and straight line A'B' in each end points of two extended cutting lines 5, was 68 degree. The space of the end points of each of the closest cutting lines 5 was 1.6 mm. Thus, 150 pieces of IC tags were produced.

The operation of the IC tag was confirmed by conducting a reading and writing test (test machine produced by FEIG ELECTRONIC GmbH, trade name "ID ISC. MR101-USB"). All 150 pieces of the produced IC tags operated normally.

And then, the release liners of 150 pieces of IC tags were peeled off, and the IC tags were attached on polypropylene resin plates each by pressing the pressure-sensitive adhesive layers 14 emerged by peeling on the surface of the polypropylene resin plate. After 24 hours, the peeling off tests of each 50 pieces of the IC tags were conducted respectively by peeling off the IC tags from the polypropylene resin plates from the cross direction as shown in FIG. 15, from the longitudinal direction as shown in FIG. 16, and from the diagonal direction as shown in FIG. 17. At the result, in peeling from each direction, the notch part 6 was peeled off along the cutting lines 5 together with the substrate of the portion except for the area surrounded with the cutting lines 5, and the circuit was broken at the notch part 6 and destroyed. This phenomenon was observed in all of 150 pieces of the IC tags.

Example 2

A protecting label was prepared by applying an acrylic pressure sensitive adhesive (produced by LINTEC Corporation, trade name "PA-T1") on the portion corresponding to the area except for the area surrounded with the cutting lines on the surface of polyethylene terephthalate sheet (produced by TOYOBO CO., LTD., trade name "CRYSPER K2411", having a thickness of 50 μm) as the protecting sheet by using a screen coater, in the amount to be a coated film having the dried thickness of 25 μm to form the second pressure-sensitive adhesive layer 15. The prepared protecting label was laminated and adhered on the surface of the substrate of the IC tag prepared in Example 1 on which the planar circuit 3 was not formed, to produce the IC tag. The adhesive strength of the pressure-sensitive adhesive layer in the area except for the area surrounded with the cutting lines was 18 N/25 mm. Thus, 150 pieces of IC tags were produced.

The operation of the IC tag was confirmed by conducting a reading and writing test (test machine produced by FEIG ELECTRONIC GmbH, trade name "ID ISC. MR101-USB"). All 150 pieces of the produced IC tags operated normally.

And then, the release liners of 150 pieces of IC tags were peeled off, and the IC tags were attached on polypropylene resin plates each by pressing the pressure-sensitive adhesive layers emerged by peeling on the surface of the polypropylene resin plate. After 24 hours, the peeling off tests of the IC tags were conducted by peeling off from three directions in the same peeling off method as described in Example 1. At the result, in peeling from each direction, the notch part 6 was peeled off along the cutting lines together with the substrate of the portion except for the area surrounded with the cutting lines, and the circuit was broken at the notch part 6 and destroyed. This phenomenon was observed in all of 150 pieces of the IC tags.

Example 3

150 pieces of the IC tag of the antenna circuit laminated with the pressure-sensitive adhesive layer of the present invention were produced in the same method as described in Example 2 except that the first pressure-sensitive adhesive layer 14 and the second pressure-sensitive adhesive layer 15 were changed in the following.

By using an acrylic resin pressure-sensitive adhesive material (which is a release sheet with the pressure-sensitive adhesive layer obtained by applying the different kinds of acrylic resin pressure-sensitive adhesive on each of the both surfaces of polyethylene terephthalate sheet having a thickness of 25 μm, to form the pressure-sensitive adhesive layers having the dried thickness of 25 μm, and then, laminating the release sheet prepared by applying silicone release agent on all surface of one side of a glassine paper, on a surface of one of the pressure-sensitive adhesive layers, produced by LINTEC Corporation, trade name of "PA-T1 PET25 M-4 8KX".) and laminating the acrylic resin pressure-sensitive adhesive double coated material on the surface on which the planar circuit 3 was formed by the side of PA-T1, the pressure-sensitive adhesive layer was formed as the first pressure-sensitive adhesive layer 14.

By using a pressure-sensitive adhesive layer having the dried thickness of 9 μm as the second pressure-sensitive adhesive layer 15 obtained by using an acrylic resin pressure-sensitive adhesive (produced by LINTEC Corporation, trade name of "M-209HZ".), the pressure-sensitive adhesive layer was formed on all area of the surface including the area surrounded with the cutting lines 5. In the pressure-sensitive adhesive layers, the adhesive strength of M-4 was 6.8 N/25 mm and the adhesive strength of M-209 HZ was 1.3 N/25 mm.

The operation of the IC tags was confirmed by the same method as described in Example 1. All 150 pieces of the produced IC tags operated normally.

And then, the IC tags were attached on polypropylene resin plates, and the peeling off tests of the IC tags were conducted by peeling off from three directions in the same peeling off method as described in Example 1. At the result, in peeling of all IC tags, the area surrounded with the cutting lines 5 alone was separated from the IC tag and remained on the polypropylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polypropylene resin plate together with the IC tag except for the area surrounded with the cutting lines 5.

Example 4

150 pieces of the IC tag of the antenna circuit laminated with the pressure-sensitive adhesive layer of the present invention were produced in the same method as described in Example 3 except that the acrylic resin pressure-sensitive adhesive material (produced by LINTEC Corporation, trade name of "PET25W PA-T1 8KX") was used as the pressure-sensitive adhesive for forming the first pressure-sensitive adhesive layer 14. In the pressure-sensitive adhesive layers, the adhesive strength of PA-T1 of the side attached to the adherend was 18 N/25 mm.

The operation of the IC tags was confirmed by the same method as described in Example 1. All 150 pieces of the produced IC tags operated normally.

And then, the IC tags were attached on polypropylene resin plates, and the peeling off tests of the IC tags were conducted by the same peeling off method as described in Example 1. At the result, in peeling of all IC tags, the area surrounded with the cutting lines 5 alone was separated from the IC tag and remained on the polypropylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polypropylene resin plate together with the IC tag except for the area surrounded with the cutting lines 5.

Example 5

150 pieces of the IC tag of the antenna circuit laminated with the pressure-sensitive adhesive layer of the present invention were produced in the same method as described in Example 4 except that the protecting label prepared by applying an acrylic pressure sensitive adhesive (produced by LINTEC Corporation, trade name "MF") on all area of the surface including the area surrounded with the cutting lines on the surface of polyethylene terephthalate sheet (produced by TOYO BO CO., LTD., trade name "CRYSPER G2311", having a thickness of 25 μm) as the protecting sheet by using a screen coater, in the amount to be a coated film having the dried thickness of 25 μm to form the second pressure-sensitive adhesive layer 15. In the pressure-sensitive adhesive layers, the adhesive strength of MF was 1.0 N/25 mm, and the 45° cantilever softness of the protecting label was 27 mm.

The operation of the IC tags was confirmed by the same method as described in Example 1. All 150 pieces of the produced IC tags operated normally.

And then, the peeling off tests of the IC tags were conducted by the same peeling off as Example 1 except that the IC tags were attached on polyethylene resin plates. At the result, in peeling of all IC tags, the area surrounded with the cutting lines 5 alone was separated from the IC tag and remained on the polyethylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polyethylene resin plate together with the IC tag except for the area surrounded with the cutting lines 5. This phenomenon was observed in all of 150 pieces of the IC tags.

Example 6

150 pieces of the IC tag of the antenna circuit laminated with the pressure-sensitive adhesive layer of the present invention were produced in the same method as described in Example 5 except that a polyethylene terephthalate sheet (produced by TORAY INDUSTRIES, INC., trade name "Lumirror T60", having a thickness of 25 μm) was used as the protecting sheet. In the IC tag, the 45° cantilever softness of the protecting label was 34 mm.

The operation of the IC tags was confirmed by the same method as described in Example 1. All 150 pieces of the produced IC tags operated normally.

And then, the peeling off tests of the IC tags were conducted by the same peeling off as Example 1 except that the IC tags were attached on polyethylene resin plates. At the result, in peeling of all IC tags, the area surrounded with the cutting lines 5 alone was separated from the IC tag and remained on the polyethylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polyethylene resin plate together with the IC tag except for the area surrounded with the cutting lines 5. This phenomenon was observed in all of 150 pieces of the IC tags.

Example 7

150 pieces of the IC tag of the antenna circuit laminated with the pressure-sensitive adhesive layer of the present invention were produced in the same method as described in Example 5 except that a polyethylene terephthalate sheet (produced by TORAY INDUSTRIES, INC., trade name "Lumirror E20", having a thickness of 25 μm) was used as the protecting sheet. In the IC tag, the 45° cantilever softness of the protecting label was 48 mm.

The operation of the IC tags was confirmed by the same method as described in Example 1. All 150 pieces of the produced IC tags operated normally.

And then, the peeling off tests of the IC tags were conducted by the same peeling off as Example 1 except that the IC tags were attached on polyethylene resin plates. At the result, in peeling of IC tags from the cross direction as shown in FIG. 15, 3 pieces of the IC tags were peeled off without breaking of the circuit, in peeling of IC tags from the longitudinal direction as shown in FIG. 16, 2 pieces of the IC tags were peeled off without breaking of the circuit, and in peeling of IC tags from the diagonal direction as shown in FIG. 17, 2 pieces of the IC tags were peeled off without breaking of the circuit. With respect to the other IC tags, the area surrounded with the cutting lines 5 alone was separated from the IC tag and remained on the polyethylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polyethylene resin plate together with the IC tag except for the area surrounded with the cutting lines 5.

Example 8

150 pieces of the IC tag of the antenna circuit laminated with the pressure-sensitive adhesive layer of the present invention were produced in the same method as described in Example 5 except that a polyethylene terephthalate sheet (produced by TOYOBO CO., LTD., trade name "CRYSPER K2411", having a thickness of 50 μm) was used as the protecting sheet. In the IC tag, the 45° cantilever softness of the protecting label was 64 mm.

The operation of the IC tags was confirmed by the same method as described in Example 1. All 150 pieces of the produced IC tags operated normally.

And then, the peeling off tests of the IC tags were conducted by the same peeling off as Example 1 except that the IC tags were attached on polyethylene resin plates. At the result, in peeling of IC tags from the cross direction as shown in FIG. 15, 5 pieces of the IC tags were peeled off without breaking of the circuit, in peeling of IC tags from the longitudinal direction as shown in FIG. 16, 4 pieces of the IC tags were peeled off without breaking of the circuit, and in peeling of IC tags from the diagonal direction as shown in FIG. 17, 3 pieces of the IC tags were peeled off without breaking of the circuit. With respect to the other IC tags, the area surrounded with the cutting lines 5 alone was separated from the IC tag and remained on the polyethylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polyethylene resin plate together with the IC tag except for the area surrounded with the cutting lines 5.

Example 9

150 pieces of the IC tag of the antenna circuit laminated with the pressure-sensitive adhesive layer of the present invention were produced in the same method as described in Example 5 except that a polyethylene terephthalate sheet (produced by TORAY INDUSTRIES, INC., trade name "Lumirror T60", having a thickness of 75 μm) was used as the protecting sheet. In the IC tag, the 45° cantilever softness of the protecting label was 73 mm.

The operation of the IC tags was confirmed by the same method as described in Example 1. All 150 pieces of the produced IC tags operated normally.

And then, the peeling off tests of the IC tags were conducted by the same peeling off as Example 1 except that the IC tags were attached on polyethylene resin plates. At the result, in peeling of IC tags from the cross direction as shown in FIG. 15, 12 pieces of the IC tags were peeled off without breaking of the circuit, in peeling of IC tags from the longitudinal direction as shown in FIG. 16, 12 pieces of the IC tags were peeled off without breaking of the circuit, and in peeling of IC tags from the diagonal direction as shown in FIG. 17, 10 pieces of the IC tags were peeled off without breaking of the circuit. With respect to the other IC tags, the area surrounded with the cutting lines 5 alone was separated from the IC tag and remained on the polyethylene resin plate. And, the circuit was broken at the notch part 6, and the IC tag was destroyed. In the peeling, the area surrounded with the cutting lines 5 was peeled off between the protecting sheet and the second pressure-sensitive adhesive layer 15, the portion corresponding to the protecting sheet in the area surrounded with the cutting lines 5 was also peeled off from the polyethylene resin plate together with the IC tag except for the area surrounded with the cutting lines 5.

Comparative Example 1

The IC tag was prepared in the same method as described in Example 1 except that the cutting line was not formed. Thus, 150 pieces of the IC tag were produced.

The operation of the IC tag was confirmed by conducting a reading and writing test (test machine produced by FEIG ELECTRONIC GmbH, trade name "ID ISC. MR101-USB"). All 150 pieces of the produced IC tags operated normally.

And then, the release liners of 150 pieces of IC tags were peeled off, and the IC tags were attached on polypropylene resin plates each by pressing the pressure-sensitive adhesive layers 14 emerged by peeling on the surface of the polypropylene resin plate. After 24 hours, the IC tags were peeled off from the polypropylene resin plates by the same method described in Example 1. At the result, in peeling from each direction, all pieces of the IC tags were peeled off without breaking of the circuit. The operation of the IC tag was confirmed by conducting a reading and writing test (test machine produced by FEIG ELECTRONIC GmbH, trade name "ID ISC. MR101-USB"). All 150 pieces of the produced IC tags operated normally.

Comparative Example 2

Figure 8:
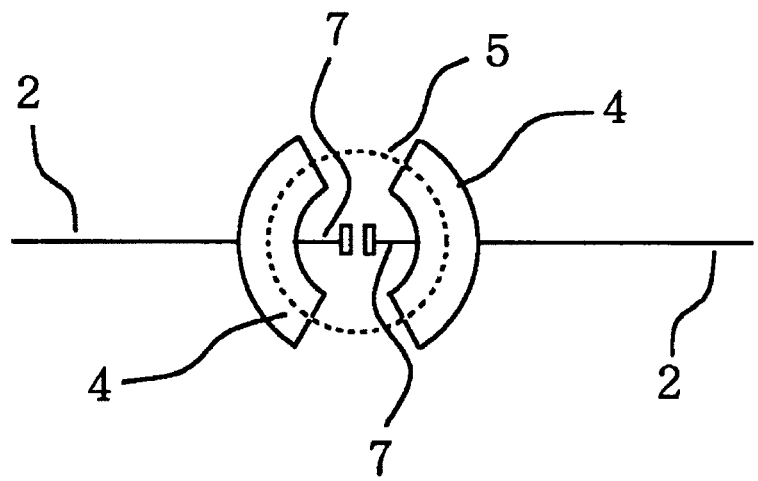
FIG. 8 shows a plane view of a shape of a cutting line in an antenna circuit of a prior art.

The IC tag was prepared in the same method as described in Example 1 except that the shape of the cutting line was the perforated cutting line shape as shown in FIG. 8, and the shape of the notch-forming part 4 was the shape as shown in FIG. 8.

The operation of the IC tag was confirmed by conducting a reading and writing test (test machine produced by FEIG ELECTRONIC GmbH, trade name "ID ISC. MR101-USB"). All 150 pieces of the produced IC tags operated normally.

And then, the release liners of 150 pieces of IC tags were peeled off, and the IC tags were attached on polypropylene resin plates each by pressing the pressure-sensitive adhesive layers emerged by peeling on the surface of the polypropylene resin plate. After 24 hours, the IC tags were peeled off from the polypropylene resin plates by the same method described in Example 1. At the result, in peeling of IC tags from the cross direction as shown in FIG. 15, 45 pieces of the IC tags were peeled off without breaking of the circuit, in peeling of IC tags from the longitudinal direction as shown in FIG. 16, 5 pieces of the IC tags were peeled off without breaking of the circuit, and in peeling of IC tags from the diagonal direction as shown in FIG. 17, 15 pieces of the IC tags were peeled off without breaking of the circuit.

The results of Examples and Comparative Examples are shown in Table 1 and Table 2.

TABLE 1

| | breaking ratio (%) after peeling off (number of pieces of destroyed IC tag) | | |
| --- | --- | --- | --- |
| | from cross direction | from longitudinal direction | from diagonal direction |
| Example 1 | 100 (50) | 100 (50) | 100 (50) |
| Example 2 | 100 (50) | 100 (50) | 100 (50) |
| Example 3 | 100 (50) | 100 (50) | 100 (50) |
| Example 4 | 100 (50) | 100 (50) | 100 (50) |
| Comparative Example 1 | 0 (0) | 0 (0) | 0 (0) |
| Comparative Example 2 | 10 (5) | 90 (45) | 70 (35) |

TABLE 2

| | | breaking ratio (%) after peeling off (number of pieces of destroyed IC tag) | | |
| --- | --- | --- | --- | --- |
| | Softness (mm) | from cross direction | from longitudinal direction | from diagonal direction |
| Example 5 | 27 | 100 (50) | 100 (50) | 100 (50) |
| Example 6 | 34 | 100 (50) | 100 (50) | 100 (50) |
| Example 7 | 48 | 94 (47) | 96 (48) | 96 (48) |
| Example 8 | 64 | 90 (45) | 92 (46) | 94 (47) |
| Example 9 | 73 | 76 (38) | 76 (38) | 80 (40) |

The invention claimed is:

1. An antenna circuit which comprises a substrate and a planar circuit comprising a circuit line of a conductive material extending laterally on a surface of the substrate and at least one conductive pad also extending laterally on the surface of the substrate and electrically connected with the circuit line of the planar circuit at at least one electrical connection point,
wherein cutting lines are provided in the substrate laterally beyond and around an outer periphery of the conductive pad,
wherein the cutting lines extend laterally into the conductive pad from the outer periphery of the conductive pad such that the cutting lines bracket the at least one connection point without traversing either the circuit lines or the connection point, and the cutting lines approach each other in the conductive pad while maintaining electrical connection within the pad, and
wherein the cutting lines extending into the conductive pad form straight lines which approach each other and define a section angle of greater than 10 degrees and less than 120 degrees.

2. The antenna circuit as claimed in claim 1, wherein the cutting lines are perforated cutting lines of alternating joints and slits.

3. The antenna circuit as claimed in claim 1, further comprising an integrated circuit chip electrically connected to the planar circuit.

4. The antenna circuit as claimed in claim 1, further comprising at least one pressure-sensitive adhesive layer laminated on the surface of the substrate on which the planar circuit is formed.

5. The antenna circuit as claimed in claim 4, wherein pressure-sensitive adhesive layers are formed on both surfaces of the substrate on which the planar circuit is formed, and further comprising a protecting sheet laminated on a surface of at least one of the pressure-sensitive adhesive layers, wherein an adhesive strength of the pressure-sensitive adhesive layer contacted to the protecting sheet in an area laterally within the cutting line is smaller than an adhesive strength of the pressure-sensitive adhesive layer contacted to an adherend in an area laterally outside the cutting line.

6. The antenna circuit as claimed in claim 4, wherein pressure-sensitive adhesive layers are formed on both surfaces of the substrate on which the planar circuit is formed, and further comprising a protecting sheet laminated on a surface of at least one of the pressure-sensitive adhesive layers, wherein an adhesive strength of the pressure-sensitive adhesive layer contacted to the protecting sheet is smaller than an adhesive strength of the pressure-sensitive adhesive layer contacted to an adherend.

7. The antenna circuit as claimed in claim 2, further comprising an integrated circuit chip electrically connected to the planar circuit.

8. The antenna circuit as claimed in claim 2, further comprising at least one pressure-sensitive adhesive layer laminated on the surface of the substrate on which the planar circuit is formed.

9. The antenna circuit as claimed in claim 3, further comprising at least one pressure-sensitive adhesive layer laminated on the surface of the substrate on which the planar circuit is formed.

10. The antenna circuit as claimed in claim 7, further comprising at least one pressure-sensitive adhesive layer laminated on the surface of the substrate on which the planar circuit is formed.

11. An antenna circuit which comprises a substrate and a planar circuit comprising a circuit line of a conductive material extending laterally on a surface of the substrate and at least one conductive pad also extending laterally on the surface of the substrate and electrically connected with the circuit line of the planar circuit at at least one electrical connection point, wherein cutting lines are provided in the substrate laterally beyond an outer periphery of the conductive pad, wherein the cutting lines are electrically non-conductive and extend laterally into the conductive pad from the outer periphery of the conductive pad such that the cutting lines bracket the at least one connection point without traversing either the circuit lines or the connection point, and the cutting lines approach each other in the conductive pad while maintaining electrical connection within the pad.

12. The antenna circuit as claimed in claim 11, wherein the cutting lines comprise perforations, each perforation extending from the surface of the substrate into the substrate.

13. The antenna circuit as claimed in claim 12, wherein the cutting lines comprise slits, each slit extending from the surface of the substrate into the substrate.

* * * * *